US008548862B2

(12) United States Patent  (10) Patent No.: US 8,548,862 B2
Giannini et al.  (45) Date of Patent: Oct. 1, 2013

(54) METHODS, SYSTEMS AND DEVICES FOR CATEGORIZATION OF ARTICLES AND ASSOCIATED IMAGES AND FOR IMAGE MERGING THEREOF

(75) Inventors: Robert Giannini, Jersey City, NJ (US); Robert J. Crawford, Apple Valley, MN (US)

(73) Assignee: Pangram Acquisitions L.L.C., Dover, DE (US)

( * ) Notice: Subject to any disclaimer, the term of this patent is extended or adjusted under 35 U.S.C. 154(b) by 241 days.

(21) Appl. No.: 12/568,488

(22) Filed: Sep. 28, 2009

(65) Prior Publication Data

US 2010/0017270 A1 Jan. 21, 2010

Related U.S. Application Data

(63) Continuation of application No. 09/531,102, filed on Mar. 17, 2000, now abandoned.

(60) Provisional application No. 60/159,476, filed on Oct. 14, 1999, provisional application No. 60/167,493, filed on Nov. 24, 1999.

(51) Int. Cl.
*G06Q 40/00* (2012.01)
(52) U.S. Cl.
USPC .............................. 705/26.1; 705/27.1; 705/35
(58) Field of Classification Search
USPC .................................... 705/27, 35, 27.1, 26.1
See application file for complete search history.

(56) References Cited

U.S. PATENT DOCUMENTS

| | | |
|---|---|---|
| 4,149,246 A | 4/1979 | Goldman |
| 4,232,334 A | 11/1980 | Dyson |
| 4,258,478 A | 3/1981 | Scott et al. |
| 4,261,012 A | 4/1981 | Maloomian |
| 4,297,724 A | 10/1981 | Masuda et al. |
| 4,434,467 A | 2/1984 | Scott |
| 4,514,178 A | 4/1985 | Noto et al. |
| 4,539,585 A | 9/1985 | Spackova et al. |
| 4,546,434 A | 10/1985 | Gioello |
| 4,731,743 A | 3/1988 | Blancato |
| 4,843,574 A | 6/1989 | Gerber |
| 4,845,636 A | 7/1989 | Walker |
| 4,854,880 A | 8/1989 | Nasby |
| 4,872,056 A | 10/1989 | Hicks et al. |
| 4,931,929 A | 6/1990 | Sherman |
| 4,964,043 A | 10/1990 | Galvin |
| 4,991,005 A | 2/1991 | Smith |

(Continued)

OTHER PUBLICATIONS www.amazon.com(not enclosed).

(Continued)

*Primary Examiner* — Lalita M Hamilton
(74) *Attorney, Agent, or Firm* — Brundidge & Stanger, P.C.

(57) ABSTRACT

An e-commerce method involves on-line viewing of a first article through a linking node for virtual merging on another structure. A particular application of the invention is directed to on-line apparel shopping involving a color matching scheme using color codes provided with images to be merged. For example, on-line viewing of one article, such as clothing, on another structure, includes creating an item from image-data corresponding to a colored article selected by an on-line viewer from an on-line viewer site with an image of a colored structure selected by the on-line viewer, and indicating whether the colored article and the colored structure satisfy a color-matching criterion.

17 Claims, 2 Drawing Sheets

(56) References Cited

U.S. PATENT DOCUMENTS

| | | |
|---|---|---|
| 4,992,050 A | 2/1991 | Edwards |
| 5,012,413 A | 4/1991 | Sroka et al. |
| 5,053,956 A | 10/1991 | Donald et al. |
| 5,111,392 A | 5/1992 | Malin |
| 5,117,354 A | 5/1992 | Long et al. |
| 5,163,006 A | 11/1992 | Deziel |
| 5,163,007 A | 11/1992 | Slilaty |
| 5,195,043 A | 3/1993 | Varner |
| 5,206,804 A | 4/1993 | Thies et al. |
| 5,244,131 A | 9/1993 | Hollingsworth |
| 5,339,252 A | 8/1994 | White et al. |
| 5,440,479 A | 8/1995 | Hutton |
| 5,495,568 A | 2/1996 | Beavin |
| RE35,184 E | 3/1996 | Walker |
| 5,504,845 A | 4/1996 | Vecchione |
| 5,515,268 A | 5/1996 | Yoda |
| 5,530,652 A | 6/1996 | Croyle |
| 5,537,211 A | 7/1996 | Dial |
| 5,550,746 A | 8/1996 | Jacobs |
| 5,551,021 A | 8/1996 | Harada et al. |
| 5,555,496 A | 9/1996 | Tackbary et al. |
| 5,559,714 A | 9/1996 | Banks et al. |
| 5,593,072 A | 1/1997 | Hester et al. |
| 5,608,852 A | 3/1997 | Hashimoto et al. |
| 5,611,730 A | 3/1997 | Weiss |
| 5,680,314 A | 10/1997 | Patterson et al. |
| 5,684,963 A | 11/1997 | Clement |
| 5,694,551 A | 12/1997 | Doyle et al. |
| 5,724,522 A | 3/1998 | Kagami et al. |
| 5,729,699 A | 3/1998 | Hashimoto et al. |
| 5,737,729 A | 4/1998 | Denman |
| 5,742,931 A | 4/1998 | Spiegelhoff |
| 5,743,407 A | 4/1998 | Williams |
| 5,745,681 A | 4/1998 | Levine et al. |
| 5,754,850 A | 5/1998 | Janssen |
| 5,781,714 A | 7/1998 | Collins et al. |
| 5,806,046 A | 9/1998 | Curran et al. |
| 5,822,216 A | 10/1998 | Satchell, Jr. et al. |
| 5,822,739 A | 10/1998 | Kara |
| 5,845,263 A | 12/1998 | Camaisa et al. |
| 5,850,222 A | 12/1998 | Cone |
| 5,852,809 A | 12/1998 | Abel et al. |
| 5,854,850 A | 12/1998 | Linford et al. |
| 5,864,851 A | 1/1999 | Breitbart et al. |
| 5,870,140 A | 2/1999 | Gillberry |
| 5,870,718 A | 2/1999 | Spector |
| 5,870,771 A | 2/1999 | Oberg |
| 5,875,108 A | 2/1999 | Hoffberg et al. |
| 5,880,974 A | 3/1999 | Tarumi et al. |
| 5,884,029 A | 3/1999 | Brush, II et al. |
| 5,892,946 A | 4/1999 | Woster et al. |
| 5,895,454 A | 4/1999 | Harrington |
| 5,905,973 A | 5/1999 | Yonezawa et al. |
| 5,907,617 A | 5/1999 | Ronning |
| 5,923,324 A | 7/1999 | Berry et al. |
| 5,930,769 A | 7/1999 | Rose |
| 5,946,665 A | 8/1999 | Suzuki et al. |
| 5,950,165 A | 9/1999 | Shaffer et al. |
| 5,950,173 A | 9/1999 | Perkowski |
| 5,970,471 A | 10/1999 | Hill |
| 5,974,400 A | 10/1999 | Kagami et al. |
| 5,983,200 A | 11/1999 | Slotznick |
| 5,983,201 A | 11/1999 | Fay |
| 5,983,267 A | 11/1999 | Shklar et al. |
| 5,995,943 A | 11/1999 | Bull et al. |
| 6,002,855 A | 12/1999 | Ladner et al. |
| 6,009,413 A | 12/1999 | Webber et al. |
| 6,014,638 A | 1/2000 | Burge et al. |
| 6,016,504 A | 1/2000 | Arnold et al. |
| 6,017,157 A | 1/2000 | Garfinicle et al. |
| 6,026,368 A | 2/2000 | Brown et al. |
| 6,026,376 A | 2/2000 | Kenney |
| 6,026,377 A | 2/2000 | Burke |
| 6,029,142 A | 2/2000 | Hill |
| 6,037,936 A | 3/2000 | Ellenby et al. |
| 6,089,424 A | 7/2000 | Colquhoun |
| 6,144,388 A | 11/2000 | Bornstein |
| 6,249,773 B1* | 6/2001 | Allard et al. ............ 705/26.8 |
| 6,293,284 B1 | 9/2001 | Rigg |
| 6,301,044 B1 | 10/2001 | Huber et al. |
| 6,310,627 B1 | 10/2001 | Sakaguchi |
| 6,323,969 B1 | 11/2001 | Shimizu et al. |
| 6,370,513 B1* | 4/2002 | Kolawa et al. ............ 705/7.33 |
| 6,415,261 B1* | 7/2002 | Cybul et al. ............ 705/14.23 |
| 6,665,577 B2 | 12/2003 | Onyshkevych et al. |
| 6,903,756 B1 | 6/2005 | Giannini |
| 7,328,177 B1* | 2/2008 | Lin-Hendel ............ 705/26.7 |
| 2002/0024528 A1 | 2/2002 | Lambertsen |

OTHER PUBLICATIONS http://jsharones.com/prod013234.h(not enclosed).
http://www.cspring.com/aero_lettering/c_match.htm(not enclosed).
www.virtualmakeover.com.
www.sesoft.com/customer/index.html.
"The World's First Whole Body Scanners Bring True Human Forms to Computer Graphics," http://www.cyberware.com/pressReleases/first WB.html (May 11, 1995), 1 page.
"ModaCAD Latest to Seek 'Net Gain on Apparel," http:/www.apparelnews.net/Archive/082898/fashion/fashfeat.html (Aug. 28, 1998), 3 pages.
"Wicks and Wilson TriForm® BodyScan booth-first time in USA," www.wwl.co.uk.
"Wicks and Wilson announces its first Body Scanning booth," www.wwl.co.uk.
"Wicks and Wilson TriForms® 3D system helps to take goalkeeping into the space age," www.wwl.co.uk.
"Modacad, Inc. Launches Women's E-commerce 'Style' Shopping Site," http//www.urlwire.com/newsarchive/050399a.html (May 3, 1999), 2 pages.
"Populating the Web: Pioneering a paradigm for photo realistic Avatars," http//www.avatarme.com/concept/concept.htm (Aug. 1999), 5 pages.
"PhotoModeler High Quality Photo-Textured Objects," http://www.eossystems.com/phototex.htm (copyright 1995-1999), 10 pages.
*Land's End Direct Merchants Catalogue* (Sep. 1999), p. 101. www.landsend.com.
"Macys.Com to Sell Borderbund Makeover Software," http//dailynews.yayoo.com/h/nm/19990903/tc/macyscom_2.html (Sep. 3, 1999), 2 pages/.
"If the Jeans Fit . . . page 3: Three Hours Later," http//www.upside.com (Sep. 3, 1999), 1 page.
"When Off-The Rack Becomes Off-The-Net," *Scientific American Presents your Bionic Future* (Nov. 1999), 5 pages.
"Macy's Eases Swimsuit Fear with Database," http://www.wired.com/news/news/story/3226.html (Apr. 17, 1997), 2pages.
"Fashion Studio," http://www.dynagraphicsinc.com/main.htm Sep. 14, 1999), 4 pages.
"What is the Dressing Sim?," http://www.toyobo.co.jp/e/mirai/dr...gsim/TopPage/aboutDressingSim.html (Sep. 14, 1999), 5 pages.
Nebojsa Jojic, http://ww.ifp. uiuc.edu/'jojic/ (Sep. 14, 1999), 5 pages.
A Framework for Garment Shopping over the Internet, Jojic et al., *Handbook of Electronic Commerce* (May 1999), 22 pages.
Media Motion Publications, Flash 'N Fashion (Copyright1995-1997), 3 pages. www.media-motion.com/.
Meta Creations Poser 4, (Sep. 14, 1999), 3 pages. www.metacreations.com.
"Finding a Look," *New York Times* (Oct. 14, 1999), 1 page.
"3D Metrics—Capturing the Dimension of Life," http://www.3dmetrics.com (copyright1999), 1 page.
"Welcome to Click Dress," http://www.hi-pic.co.il/ (Dec. 27, 1999), 1 page.
"Killer Loop Virtual Preview," http://www.killerloopeyewear.com/html/klyp.html (Dec. 2, 1999), 1 page.
www.peepsun.com.
http://marketwiz.net.

www.pearlevision.com.
www.beyond.com.
http.//orders.xoom.com.
www.itreviews.com.
"Welcome to Ray Ban Virtual Preview," http://www.rayban.com/htm/rbvp.html (Dec. 2, 1999), 2 pages.

QuickyMart TM Cuts Cost, Eases Set-Up of 'Me-Commerce' Sites: PR Newswire (Jul. 28, 1999).
"Herman Miller's New online 'Room Planner' Makes Designing from Home Fun and Easy" PR Newswire (Mar. 18, 1999).

* cited by examiner

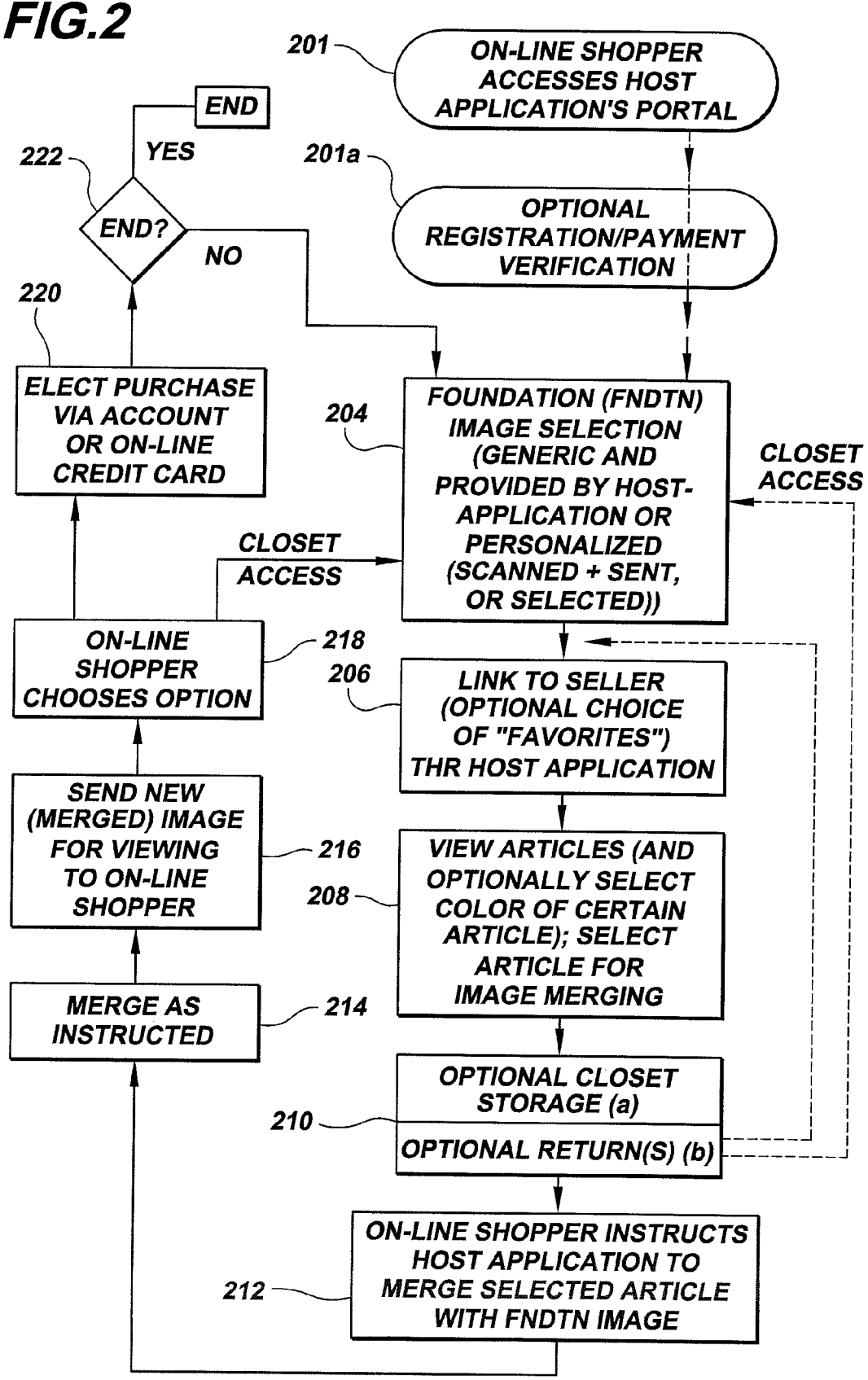

METHODS, SYSTEMS AND DEVICES FOR CATEGORIZATION OF ARTICLES AND ASSOCIATED IMAGES AND FOR IMAGE MERGING THEREOF

RELATED PATENT DOCUMENTS

This patent document is a continuation under 35 U.S.C. §120 of U.S. patent application Ser. No. 09/531,102 filed on Mar. 17, 2000, which claims benefit of U.S. Provisional Patent Application Ser. No. 60/167,493 filed Nov. 24, 1999, and of U.S. Provisional Patent Application Ser. No. 60/159,476 filed Oct. 14, 1999, which are incorporated herein by reference.

FIELD OF THE INVENTION

The present invention relates generally to e-commerce and, more specifically, to use of linked web servers sites for on-line shopping.

BACKGROUND

The consumer in today's market is limited to a particular retailer's or department store's inventory, selection and styles. Traditionally, a consumer shops for items from different stores with the anticipation and hope that the items will coordinate. Alternatively, a consumer will wait for an opportunity to try on all the different items purchased and return those items that do not coordinate. Recent technological advances have attempted to enhance the shopping ability through the use of e-commerce, sometimes referred to as "online buying" or "online shopping."

There are differences inherent between "online buying" and "online shopping" in that current e-commerce transactions are based on the individual buying goods or services online that they have either decided to buy prior to logging on to the internet or find as a result of bargain hunting on the internet. There is very little, if any, true shopping on the internet. Most women define shopping as an "experience" "fun" "exciting" and the like. True shopping is going to a mall or department store with the intention of buying yet to be determined goods or services. Few consumers are getting on the internet with the same mindset that they have before they physically go shopping. It is the difference between logging onto the internet to buy an additional pair of Levi's Jeans and going shopping and then coming home with 2 pairs of Levi's Jeans, a belt, 2 sweaters and 2 shirts.

A particular problem that arises in connection with shopping electronically concerns color matching. Unlike true shopping where the buying experience involves the ability of the user to color-match articles based on actual appearances, the colors of the articles are mischaracterized when displayed for the shopper over a computer terminal. This alteration is largely due to miscalibrations at both the input (e.g., image capturing) and the output, for example, the display terminal itself. Consequently, few consumers are comfortable color matching items over the internet.

SUMMARY

One aspect of the present invention is generally directed to a method for on-line viewing of articles that are color matched using a color-identification standard. An example implementation of this aspect of the present invention involves on-line viewing of a first article through a linking node for virtual merging on another structure. A color matching scheme uses color codes provided with the images to be merged. In a more particular example, on-line viewing of one article, such as clothing, on another structure, includes creating an item from image-data corresponding to a colored article selected by an on-line viewer from an on-line viewer site with an image of a colored structure selected by the on-line viewer, and indicating whether the colored article and the colored structure satisfy a color-matching criterion.

Another particular application of the present invention involves an on-line viewer linked to the host-site and to a virtual closet maintained by the host-site. The host-site selects a structure in response to a command received by the on-line viewer, and using the host-site, the viewer is linked to the article-provider site and images are passed from that site for view by the on-line viewer. A selected one of the articles is merged with the structure by forming an image including representations of both the structure and the selected article.

An optional feature allows each user a certain amount of storage capacity, referred to as a "closet," where the user can store different items from multiple stores as they move from store to store, each time bringing back different items to mix and match, coordinate and so on. This storage space allows the consumer to put items "on hold" for a limited period of time without purchasing them. Color codes are included with each article stored in the closet. This feature allows consumers to return at a later date and purchase these items with a full appreciation of their color coordination.

The above summary of the present invention is not intended to describe each illustrated embodiment or every implementation of the present invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 2 is a flowchart of an example manner for implementing one aspect of the present invention.

Figure 1:
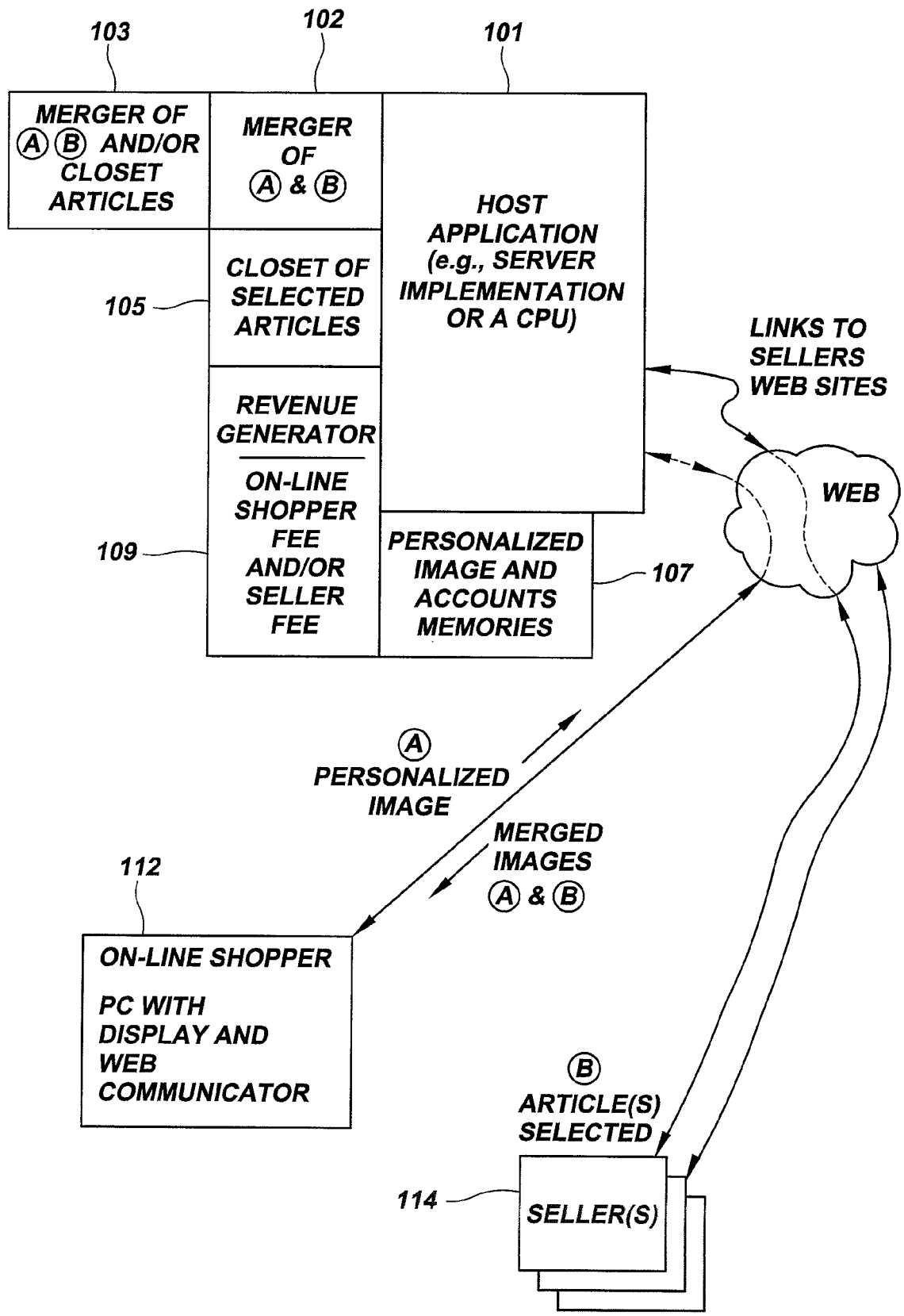
FIG. 1 illustrates a block diagram of a system for implementing the present system in accordance with one example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally directed to a method and system involving e-commerce over interconnected communication networks such as those currently known as the Internet. The present invention is particularly suited for conveniently bringing virtual apparel into customers' respective homes and permitting customers to try on the apparel before accepting/purchasing the apparel. While the present invention is not necessarily so limited, a better understanding of the invention will be found by reading the detailed description and exemplary embodiments that follow.

FIG. 1 illustrates an example embodiment of a method and system for implementing the present system. The system includes a host application server 101 including several example functional blocks. These blocks include a block 102 that merges two images A and B (e.g. corresponding to a personalized or generic article identified by the on-line shopper, and a foundation or structure image to be merged with the identified article). Another block 103 permits merging of images selected from A, B, and/or articles previously stored in a "closet," depicted as block 105. Another block 107 includes personalized images and an inventory of generic images corresponding to the foundation or structure. A revenue generator block 109 provides fee generation from on-line shoppers who subscribe to the host application server per on-line or off-line agreement, and/or fee generation from retailers (or sellers) and others such as magazine publishers desiring participation and benefit from the system of FIG. 1.

The on-line shopper uses a PC or intelligent black box 112 to access the host application server 101. Through this access, the on-line shopper either selects a generic structure from an inquiry of such structures provided by block 107 or provides a personalized image (for example, a scanned image of himself or of his house) to be used as the structure. Using the host application server 101, the on-line shopper is coupled through the web to a seller, depicted at block 114. Images of selectable articles are communicated back to the on-line shopper over the web and through the host application server 101. The on-line shopper selects one or more articles from at least one of the sellers for storage in the closet 105, and/or for merging with the previously-selected structure. Similarly, the structure can be changed per a command from the on-line shopper so as to merge the selected article(s) with different structures. In response, the host application server 101 processes images corresponding to the article and structure and generates a new image including representations of both the structure and the article.

FIG. 2 is a flow chart of an example process for implementing the example system of FIG. 1, according to the present invention. As discussed above, after accessing the host application server 201, optionally the host application server verifies registration/payment as is conventional with current on-line shopping as depicted at 201*a*. At block 204 the structure or foundation is selected as discussed above, and at block 206 the link is made to the seller. At block 208 the article(s) is viewed by the on-line shopper and, optionally, a selection of a color and/or size for the article is made. Next, the on-line shopper selects the article as a candidate for storage in the closet and/or for merging with the structure.

At block 210 the on-line shopper instructs the host application server to store the article in the closet by returning to block 204, merge with the structure as depicted at block 212, or return to block 206 for linking to the same seller or another seller for additional viewing.

From block 212 flow proceeds to block 214 where the new image is created per the merger instruction.

Next, at block 216, the new image is sent for viewing to the on-line shopper.

At block 218 the on-line shopper chooses one of multiple options. Either the closet is accessed and the on-line shopper returns to block 204, or an election is made to purchase the article and/or other articles that may have been stored in the closet as depicted in block 220. From block 220, flow proceeds to block 222 where the on-line shopper decides to return to block 204 or end the transaction.

Example articles can be: A) clothing; B) paint; C) furniture; D) glassware; E) landscaping; F) orthodontic and teeth ware; G) cabinetry; H) plastic-surgery type enhancements; I) car/person.

Example foundation for merger with corresponding article(s) can be: a) person, pet; b) house, cars, etc.; c) house, cars, office, etc.; d) kitchen, face; e) yard; f) mouth; g) rooms in office/house; h) person (chest, face, belly, etc.); I) person/car.

In another example embodiment according to the present invention, an important advantage relating to color matching is achieved using a commonly-used color standard that covers sufficient color variations to permit various articles to be matched to one another. In one more specific embodiment, an industry color-standardization scheme is used. Examples include: Exxel Color Match Guide (see http://sharones.com/prod013234.htm) and Color match Chart (http://www.c-springs.com/aero_lettering/c_match.htm). More sophisticated color standardization schemes include the above examples in combination with equipment specifically identifying a frequency range corresponding to the color of the article in question or the equipment approach by itself.

Example equipment of this type includes optics-based detectors adapted to provide a measured (color) frequency in a given light condition/environment. For example, white light may be used along with selected background materials characterized within certain selected ranges of reflectivity. Other definitional parameters needed and/or useful in connection therewith will be apparent to those skilled in the art.

In a particular application, the color frequencies measured for the articles to be matched are reported and provided in the form of a tag that is carried with the article, electronically for the web server shopping function and, optionally, as a supplemental hard-copy coded label (e.g., as part of or as a supplementation to the coding used on a bar code label). In a more particular implementation involving this use as part of the bar code label, the conventional bar code scanners and bar code generators are modified and adapted to receive the color frequency of the article and to conveniently report the color frequency in conjunction with the electronic shopping function and/or the conventional/reality shopping applications.

In yet another more specific embodiment, the closet of selected articles (as described for example in connection with block 105 of FIG. 1) is electronically defined using a partial-data set corresponding to each of the closeted articles. In one application thereof, the partial-data set comprises an outline definition of each of the articles along with the color frequency codes linked to the various sections of each article, as necessary to fully define the article in terms of article shape and color. Further, the size of the article is also stored as part of the partial-data set. Collectively, these various pieces advantageously define all needed aspects of each article in the closet without having to consume excessive amounts of memory and without requiring excessive processing to recreate the article for view by the user.

The virtual closet discussed above in connection with FIG. 1 can be used to permit the shopper to buy or hold (without buying) an article and subsequently retrieving the article for matching to other articles in terms of structure, size, color and other stylistic aspects. In applications concerned with limited memory bandwidth, the host application can provide a maximum amount of storage space for each shopper, with additional storage space being provided for a fee. These data stored in such memory is limited to a fixed-period, e.g., one month, with extensions being provided for yet additional consideration, such as a monthly fee or purchases of items stored in the closet during an immediately preceding period. This approach advantageously encourages the shoppers to revisit the host application repeatedly to access their personalized virtual closet, and advantageously provides on-going advertising for (which is also optionally billed on a related, on-going basis to) the seller/retailers.

According to another aspect of the present invention, on-line shoppers (for example 112 of FIG. 1) are provided a number of selectable icons or other data permitting feedback from the host/server (for example 101 of FIG. 1). Examples include: expert fashion advice (e.g., professional consultants employed by the retailers (for example sellers 114 of FIG. 1), outside fashion consultants and/or employees of the entity providing the host application (101 of FIG. 1); on-line offers from the sellers (discounts, sales, etc.); updates on up-coming styles, colors, the most recent and hottest fashions. Each of these various offerings is optionally categorized for convenient selection by the shopper/user, for example, by category, style, activities, retailers. Advantageously, this application permits the host application to provide the sellers unique demographic information pertaining to particular customers' interests, selection trends and other data useful in attracting the shoppers to the retailers.

For convenience to the shoppers, a feedback icon can be used to provide a "favorite retailers" list to be defined by each shopper. When the shopper logs onto the host application, any of these favorite retailers can be immediately linked to for various uses. Examples include: reviewing closeted items and making changes thereto for a particular retailer, checking sales at that particular retailer and/or continuing to shop at a particular retailer without being required to return to the host application web site. Further, as a shopper links from retailer to retailer (the "Favorites"), a "shopping basket" can be selected and filled as the shopper accesses the articles According to another important aspect of the present invention, the host application includes a search engine that searches selected, or all, participating sellers/retailers for particular merchandise, as identified by the on-line shopper. In one implementation, this service is provided to the shopper using a selectable icon or other feedback data as discussed above. At this point, the host application can: list all such retailers and allow the shopper to link to their web site; virtually pull the item from the respective web sites and allow the shopper to "try on" the article or store it in the closet (with a variation which optionally permits the shopper to change the size and color); and/or a combination of these approaches.

Implementation of the merging function can be accomplished using one or more of a variety of currently-available methods. Examples of such methods include those used in connection with web sites: www.virtualmakeover.com and www.segasoft.com/customer/index.html. Other example implementations are described and illustrated in U.S. Pat. No. 5,930,769 entitled, "System and Method for Fashion Shopping." Various types of software and hardware can be used to implement each aspect of the system and method described.

As noted above, the present invention is applicable to a number of techniques for merging various types of structures, or foundations, with one or more corresponding articles. The present invention should not be considered limited to the particular examples described above, but rather should be understood to cover all aspects of the invention as fairly set out in the attached claims. For example, the present invention could be characterized as covering one or more of the above characterized features. Accordingly, various modifications, equivalent processes, as well as numerous structures to which the present invention may be applicable will be readily apparent to the skilled artisan upon review of the present specification.

What is claimed is:

1. A method comprising:
providing an application portal for access by remote computers operated by on-line shoppers for linking to one or more plurality of websites, as hosted by different retailers, that respectively permit for remote selection and communication of articles available from the different retailers;
categorizing viewable articles according to a parameter and listing the different retailers for selection by an on-line shopper;
in response to the on-line shopper selecting one or more articles from the different retailers, sending image data of the selected one or more articles from the one or more plurality of websites of the different retailers to a remote computer operated by the on-line shopper, the image data configured to display the articles in groups according to the categorization;
receiving, from the remote computer, selection data identifying at least one of the one or more articles offered for sale by the different retailers;
merging the image data for the at least one of the selected one or more articles with image data for a structure to generate a merged image data of the at least one of the selected one or more articles applied so that the merged image data depicts the structure as a foundation upon which the at least one of the selected one or more articles is located; and
sending the merged image data for display at the remote computer.

2. The method of claim 1, wherein the parameter includes one of style, activities and retailers.

3. The method of claim 1, further comprising providing the on-line shoppers with selection options for the parameter and wherein the categorizing is implemented as a function of a selection by the on-line shopper.

4. The method of claim 1, further comprising registering the on-line shoppers by obtaining identification and demographic information for the on-line shoppers.

5. The method of claim 4, further comprising tracking purchases for the on-line shoppers and for providing selection preferences and demographic information about the on-line shoppers to the different retailers.

6. The method of claim 4, further comprising: saving a list of favorite items for the on-line shoppers; and retrieving the saved list in response to the on-line shopper subsequently logging onto the application portal.

7. The method of claim 4, further comprising presenting discount information for viewable articles associated with a particular retailer that is identified as a favorite retailer for a particular on-line shopper.

8. The method of claim 1, wherein the structure includes one of a person, pet, house, car, office, kitchen, face, mouth, room in an building, and a portion of a person.

9. The method of claim 1, further comprising uploading the image data for the structure from the on-line shopper.

10. The method of claim 1, further comprising providing the on-line shopper with a plurality of colors and sizes of articles available from the different retailers to facilitate a selection, by the on-line shopper, of one or more colors and sizes available and corresponding to the selected articles.

11. The method of claim 10, wherein in response to a further selection, by the on-line shopper, of one or more of the plurality of colors and sizes of articles available from the different retailers, changing the merged image data to depict the further selection.

12. The method of claim 11, wherein in response to a further selection, by the on-line shopper, of one or more of the plurality of colors, changing the merged image data to depict the further selection of the one or more of the plurality of colors along with an indication or a report for color-matching indication for identifying one of a plurality of color variations for the selected articles.

13. An apparatus comprising:
    means for providing an application portal for access by remote computers operated by on-line shoppers for linking to one or more plurality of websites, as hosted by different retailers, that respectively permit for remote selection and communication of articles available from the different retailers;
    means for categorizing viewable articles according to a parameter and listing the different retailers for selection by an on-line shopper;
    means for sending, in response to an online shopper selecting one or more articles from the different retailers, image data of the selected one or more articles from the one or more plurality of websites of the different retailers to a remote computer operated by the on-line shopper, the image data configured to display the articles in groups according to the categorization;
    means for receiving, from the remote computer, selection data identifying at least one of the one or more articles offered for sale by the different retailers;
    means for merging the image data for the at least one of the selected one or more articles with image data for a structure to generate a merged image data of the at least one of the selected one or more articles applied so that the merged image data depicts the structure as a foundation upon which the at least one the selected one or more articles is located; and
    means for communicating the merged image data for display at the remote computer.

14. An apparatus comprising:
    a computer-based server configured to: provide an application portal for access by remote computers operated by on-line shoppers for linking to one or more plurality of websites, as hosted by different retailers, that respectively permit for remote selection and communication of articles available from the different retailers, and provide categorized viewable articles according to a parameter and listing the different retailers for selection by an on-line shopper;
    send, in response to an online shopper selecting one or more articles from the different retailers, image data of the selected one or more articles from the one or more plurality of websites of the different retailers to a remote computer operated by the on-line shopper, the image data configured to display the articles in groups according to the categorization;
    receive, from the remote computer, selection data identifying at least one of the one or more articles offered for sale by the different retailers;
    merge the image data for the at least one of the selected articles with image data for a structure to generate a merged image data of the at least one of the selected articles applied so that the merged image data depicts the structure as a foundation upon which the at least one of the selected articles is located; and
    communicate with the remote computer for display of the merged image at the remote computer.

15. The apparatus of claim 14, wherein the computer-based server is further configured to provide the on-line shopper with a plurality of colors and sizes to facilitate a selection, by the on-line shopper, of one or more colors and sizes available and corresponding to the selected articles.

16. The apparatus of claim 15, wherein the computer-based server is further configured to, in response to a further selection by the on-line shopper and of one or more of the plurality of colors and sizes, change the merged image data to depict the further selection.

17. The apparatus of claim 16, wherein the computer-based server is further configured and to, in response to a further selection by the on-line shopper and of one or more of the plurality of colors, change the merged image data to depict the further selection of the color along with an indication or a report for color-matching indication for identifying one of plurality of color variations for the selected articles.

* * * * *

UNITED STATES PATENT AND TRADEMARK OFFICE
CERTIFICATE OF CORRECTION

PATENT NO. : 8,548,862 B2  Page 1 of 1
APPLICATION NO. : 12/568488
DATED : October 1, 2013
INVENTOR(S) : Giannini et al.

It is certified that error appears in the above-identified patent and that said Letters Patent is hereby corrected as shown below:

On Title Page 2, in item (56), under "OTHER PUBLICATIONS", in Column 2, Line 28, delete "Borderbund" and insert -- Brøderbund --, therefor.

In the Specification

In Column 5, Line 31, delete "articles" and insert -- articles. --, therefor.

In the Claims

In Column 6, Line 35, in Claim 3, delete "parameter and" and insert -- parameter, and --, therefor.

In Column 7, Line 33, in Claim 13, delete "one the" and insert -- one of the --, therefor.

In Column 8, Line 35, in Claim 17, delete "and to," and insert -- to, --, therefor.

Signed and Sealed this
Eighteenth Day of March, 2014

Michelle K. Lee
*Deputy Director of the United States Patent and Trademark Office*